United States Patent
Majaniemi

(10) Patent No.: US 11,218,507 B2
(45) Date of Patent: Jan. 4, 2022

(54) METHOD AND SYSTEM FOR OPERATING AND MONITORING PERMISSIONS FOR APPLICATIONS IN A ELECTRONIC DEVICE

(71) Applicant: Nokia Technologies Oy, Espoo (FI)

(72) Inventor: Sami Kalervo Majaniemi, Tampere (FI)

(73) Assignee: Nokia Technologies Oy, Espoo (FI)

( * ) Notice: Subject to any disclaimer, the term of this patent is extended or adjusted under 35 U.S.C. 154(b) by 70 days.

(21) Appl. No.: 15/027,528

(22) PCT Filed: Oct. 18, 2013

(86) PCT No.: PCT/IB2013/059452
§ 371 (c)(1),
(2) Date: Apr. 6, 2016

(87) PCT Pub. No.: WO2015/056056
PCT Pub. Date: Apr. 23, 2015

(65) Prior Publication Data
US 2016/0248810 A1 Aug. 25, 2016

(51) Int. Cl.
*H04L 29/06* (2006.01)
*G06F 21/53* (2013.01)
(Continued)

(52) U.S. Cl.
CPC .............. *H04L 63/20* (2013.01); *G06F 9/468* (2013.01); *G06F 21/53* (2013.01); *H04L 63/10* (2013.01)

(58) Field of Classification Search
CPC ...... G06F 21/53; G06F 21/552; G06F 21/577; G06F 21/335; G06F 21/629; G06F 9/468;
(Continued)

(56) References Cited

U.S. PATENT DOCUMENTS 7,200,865 B1 * 4/2007 Roscoe ................. H04L 63/104
726/12
8,255,280 B1 * 8/2012 Kay ..................... H04L 67/2842
705/26.1
(Continued)

FOREIGN PATENT DOCUMENTS

JP 2010-079901 A 4/2010
WO 2013025785 A1 2/2013

OTHER PUBLICATIONS

Bugiel, Sven, et al. "Practical and lightweight domain isolation on android." Proceedings of the 1st ACM workshop on Security and privacy in smartphones and mobile devices. ACM, 2011. (Year: 2011).*

(Continued)

*Primary Examiner* — Michael Simitoski
(74) *Attorney, Agent, or Firm* — Mintz Levin Cohn Ferris Glovsky and Popeo, P.C.

(57) ABSTRACT

A flexible framework is provided for specifying permissions a user allows for an application to access. The framework further provides for specifying the way in which the application can behave during run-time. Predefined rules are used to detect a potentially misbehaving application, and a user may be notified or a specific action may be taken. Behavior of the application may be monitored during run-time to verify that the application is behaving in accordance to the predefined rules.

16 Claims, 6 Drawing Sheets

(51) Int. Cl.
 *G06F 9/46* (2006.01)
 *G06F 11/30* (2006.01)
(58) Field of Classification Search
 CPC ........ H04L 63/10; H04L 63/20; H04W 12/08; H04W 4/003
 See application file for complete search history.

(56) References Cited

U.S. PATENT DOCUMENTS

| | | | |
|---|---|---|---|
| 8,255,991 B1 | 8/2012 | Hackborn et al. | |
| 8,499,063 B1* | 7/2013 | Satish | G06F 8/62 709/220 |
| 8,595,489 B1* | 11/2013 | Faaborg | H04W 12/02 713/166 |
| 8,769,676 B1* | 7/2014 | Kashyap | G06F 21/554 726/22 |
| 8,958,336 B2* | 2/2015 | Rados | H04L 65/1016 370/253 |
| 8,984,628 B2* | 3/2015 | Mahaffey | G06F 21/564 713/187 |
| 9,224,146 B2* | 12/2015 | Hayhow | G06Q 20/20 |
| 9,386,463 B1* | 7/2016 | Contino | H04W 24/02 |
| 9,430,641 B1* | 8/2016 | Marion | G06F 21/53 |
| 9,665,465 B1* | 5/2017 | Jain | G06F 11/3612 |
| 2001/0034712 A1* | 10/2001 | Colvin | G06F 21/121 705/52 |
| 2004/0230835 A1* | 11/2004 | Goldfeder | G06F 21/51 726/23 |
| 2005/0183143 A1* | 8/2005 | Anderholm | G06F 11/32 726/22 |
| 2006/0090192 A1* | 4/2006 | Corby | G06F 21/51 726/1 |
| 2006/0107327 A1 | 5/2006 | Sprigg et al. | |
| 2008/0016339 A1* | 1/2008 | Shukla | G06F 21/53 713/164 |
| 2008/0189793 A1 | 8/2008 | Kirkup et al. | |
| 2009/0260052 A1 | 10/2009 | Bathula et al. | |
| 2010/0024016 A1* | 1/2010 | Violleau | G06F 21/335 726/7 |
| 2010/0251369 A1* | 9/2010 | Grant | G06F 21/554 726/23 |
| 2011/0023118 A1* | 1/2011 | Wright | G06F 11/28 726/23 |
| 2011/0047597 A1* | 2/2011 | Mahaffey | G06F 21/564 726/3 |
| 2011/0145920 A1* | 6/2011 | Mahaffey | G06F 21/564 726/22 |
| 2011/0225649 A1 | 9/2011 | Bhogal et al. | |
| 2011/0276951 A1* | 11/2011 | Jain | G06F 11/3006 717/140 |
| 2012/0072991 A1* | 3/2012 | Belani | H04W 4/001 726/25 |
| 2012/0110174 A1* | 5/2012 | Wootton | G06F 21/564 709/224 |
| 2012/0110674 A1* | 5/2012 | Belani | H04W 4/001 726/25 |
| 2012/0137349 A1 | 5/2012 | Lundblade et al. | |
| 2012/0209923 A1 | 8/2012 | Mathur et al. | |
| 2012/0307565 A1 | 12/2012 | Carrara et al. | |
| 2012/0311697 A1* | 12/2012 | Swingler | G06F 21/6218 726/17 |
| 2012/0317638 A1* | 12/2012 | Carrara | G06F 21/44 726/17 |
| 2013/0055378 A1 | 2/2013 | Chang et al. | |
| 2013/0067531 A1* | 3/2013 | Morris | G06F 21/54 726/1 |
| 2013/0097659 A1* | 4/2013 | Das | G06F 21/629 726/1 |
| 2013/0097660 A1* | 4/2013 | Das | H04L 63/10 726/1 |
| 2013/0205385 A1* | 8/2013 | Roesner | G06F 21/6245 726/17 |
| 2013/0263206 A1* | 10/2013 | Nefedov | G06F 21/6218 726/1 |
| 2013/0276055 A1* | 10/2013 | Jacobson | H04L 29/06 726/1 |
| 2013/0318627 A1* | 11/2013 | Lundkvist | G06F 21/445 726/27 |
| 2013/0333039 A1* | 12/2013 | Kelly | G06F 21/51 726/24 |
| 2014/0032691 A1* | 1/2014 | Barton | H04L 41/00 709/206 |
| 2014/0201806 A1* | 7/2014 | Kumar | H04L 63/1416 726/1 |
| 2014/0245448 A1* | 8/2014 | Moon | G06F 21/57 726/25 |
| 2014/0359695 A1* | 12/2014 | Chari | G06F 21/31 726/1 |
| 2015/0106940 A1* | 4/2015 | Borghetti | G06F 21/577 726/25 |
| 2017/0293767 A1* | 10/2017 | Barton | G06F 21/606 |

OTHER PUBLICATIONS

Bugiel, Sven, et al. "Xmandroid: A new android evolution to mitigate privilege escalation attacks." Technische Universität Darmstadt, Technical Report TR-2011-04 (2011). (Year: 2011).*
Xu, Rubin, Hassen Saïdi, and Ross J. Anderson. "Aurasium: Practical Policy Enforcement for Android Applications." USENIX Security Symposium. vol. 2012. 2012. (Year: 2012).*
Zhang, Yuan, et al. "Vetting undesirable behaviors in android apps with permission use analysis." Proceedings of the 2013 ACM SIGSAC conference on Computer & communications security. ACM, 2013. (Year: 2013).*
W. Enck, M. Ongtang and P. McDaniel, "Understanding Android Security," in IEEE Security & Privacy, vol. 7, No. 1, pp. 50-57, Jan.-Feb. 2009. (Year: 2009).*
N. Samteladze and K. Christensen, "DELTA: Delta encoding for less traffic for apps," 37th Annual IEEE Conference on Local Computer Networks, Clearwater, FL, 2012, pp. 212-215. (Year: 2012).*
A. Bartel, J. Klein, Y. Le Traon and M. Monperrus, "Automatically securing permission-based software by reducing the attack surface: an application to Android," 2012 Proceedings of the 27th IEEE/ACM International Conference on Automated Software Engineering, Essen, 2012, pp. 274-277. (Year: 2012).*
Burguera, Iker, Urko Zurutuza, and Simin Nadjm-Tehrani. "Crowdroid: behavior-based malware detection system for android." Proceedings of the 1st ACM workshop on Security and privacy in smartphones and mobile devices. 2011. (Year: 2011).*
Wu, Dong-Jie, et al. "Droidmat: Android malware detection through manifest and api calls tracing." 2012 Seventh Asia Joint Conference on Information Security. IEEE, 2012. (Year: 2012).*
Zhou, Yajin, et al. "Hey, you, get off of my market: detecting malicious apps in official and alternative android markets." NDSS. vol. 25. No. 4. 2012. (Year: 2012).*
V. Arena, V. Catania, G. La Torre, S. Monteleone and F. Ricciato, "SecureDroid: An Android security framework extension for context-aware policy enforcement," 2013 International Conference on Privacy and Security in Mobile Systems (PRISMS), Atlantic City, NJ, 2013, pp. 1-8. (Year: 2013).*
A. Egners, U. Meyer and B. Marschollek, "Messing with Android's Permission Model," 2012 IEEE 11th International Conference on Trust, Security and Privacy in Computing and Communications, Liverpool, 2012, pp. 505-514. (Year: 2012).*
D. Feth and A. Pretschner, "Flexible Data-Driven Security for Android," 2012 IEEE Sixth International Conference on Software Security and Reliability, Gaithersburg, MD, 2012, pp. 41-50. (Year: 2012).*
W. Shin, S. Kwak, S. Kiyomoto, K. Fukushima and T. Tanaka, "A Small but Non-negligible Flaw in the Android Permission Scheme," 2010 IEEE International Symposium on Policies for Distributed Systems and Networks, Fairfax, VA, 2010, pp. 107-110. (Year: 2010).*

(56) References Cited

OTHER PUBLICATIONS

Extended European Search Report received for corresponding European Patent Application No. 13895606.5, dated Dec. 19, 2017, 7 pages.
Final Office action received for corresponding Japanese Patent Application No. 2016-524053, dated Jan. 9, 2018, 2 pages of office action and 3 pages of translation available.
International Search Report and Written Opinion received for corresponding Patent Cooperation Treaty Application No. PCT/IB2013/059452, dated Jun. 25, 2014, 13 pages.
Zhou et al., "Taming Information-Stealing Smartphone Applications (on Android)", Proceedings of the 4th International Conference on Trust and Trustworthy Computing, Jun. 22-24, 2011, 15 pages.
Nauman et al., "Apex: Extending Android PermissionModel and Enforcement with User-defined Runtime Constraints" Proceedings of the 5th ACM Symposium on Information, Computer and Communications Security, Apr. 13-16, 2010, pp. 328-332.
Office action received for corresponding Japanese Patent Application No. 2016-524053, dated May 16, 2017, 3 pages of office action and 6 pages of translation available.
Hayashi et al., "A Study on Android Security Improvement at Application Runtime", IPSJ Symposium, vol. 2012, No. 1, Jun. 26, 2012, pp. 2211-2216.

* cited by examiner

METHOD AND SYSTEM FOR OPERATING AND MONITORING PERMISSIONS FOR APPLICATIONS IN A ELECTRONIC DEVICE

RELATED APPLICATION

This application was originally filed as Patent Cooperation Treaty Application No. PCT/IB2013/059452 filed Oct. 18, 2013.

This disclosure relates to a method, apparatus, and computer program for operating one or more applications.

A wireless communication system can be seen as a facility that enables wireless carriers between two or more nodes such as fixed or mobile communication devices, access points such as base stations, servers and so on. A communication system and compatible communicating devices typically operate in accordance with a given standard or specification which sets out what the various entities associated with the system are permitted to do and how that should be achieved. For example, the standards, specifications and related protocols can define the manner how and what communication devices shall communicate, how various aspects of the communications shall be implemented and how the devices shall be configured. Examples of wireless systems include public land mobile networks (PLMN) such as cellular networks, satellite based communication systems and different wireless local networks, for example wireless local area networks (WLAN). Wireless systems can be divided into coverage areas referred to as cells. Different types of cells can provide different features. For example, cells can have different shapes, sizes, power levels and other characteristics.

A user can access the communication system by means of an appropriate communication device. A communication device of a user is often referred to as user equipment (UE) or terminal. A communication device is provided with an appropriate signal receiving and transmitting arrangement for enabling communications with other parties. Wireless systems enable mobility for users where a mobile device can communicate over an air interface with another communication device such as e.g. a base station and/or other user equipment.

Software applications or "apps" may run on the UE so as to provide a function thereto. For example a weather related application can quickly provide information to a user regarding the weather. For an application to operate properly it may need access to information, for example location information, associated with the user equipment. This may raise security concerns for users.

Accordingly in a first aspect there is provided a method comprising: receiving a request from a second application to access information from a first application, said first and second applications installed on a user equipment, and in response to said request, determining whether said second application is operating in accordance with at least one rule.

Preferably said method comprises providing said information to said second application when it is determined that said second application is operating in accordance with said at least one rule.

Preferably said method comprises denying said information to said second application when it is determined that said second application is not operating in accordance with said at least one rule.

Preferably said method comprises halting said second application when it is determined that said second application is not operating in accordance with said at least one rule Preferably said at least one rule is at least one of: defined by a developer of said first application; defined by a user of said user equipment; automatically created by said user equipment.

Preferably said at least one rule is enforced by at least one of: said first application; an operating system of said user equipment.

Preferably said information is protected by a custom permission of said first application.

Preferably said custom permission is created by a developer of said first application.

Preferably said at least one rule is integrated with said first application.

Preferably said method comprises monitoring behaviour of said second application for a period of time.

Preferably said monitoring comprises monitoring a manner in which the second application uses the information.

Preferably said monitoring is triggered by said request.

Preferably said method comprises defining a threshold number of contraventions of said at least one rule, and denying said information to said second application once said threshold number has been reached.

In a second aspect there is provided a computer program comprising computer executable instructions which when run on one or more processors perform the method of the first aspect.

In a third aspect there is provided an apparatus comprising at least one processor; and at least one memory including computer program code; the at least one memory and the computer program code configured to, with the at least one processor, cause the apparatus at least to: receive a request from a second application to access information from a first application, said first and second applications installed on said apparatus, and in response to said request, determine whether said second application is operating in accordance with at least one rule.

Preferably said at least one processor and said at least one memory are configured to cause said apparatus to provide said information to said second application when it is determined that said second application is operating in accordance with said at least one rule.

Preferably said at least one processor and said at least one memory are configured to cause said apparatus to deny said information to said second application when it is determined that said second application is not operating in accordance with said at least one rule.

Preferably said at least one processor and said at least one memory are configured to cause said apparatus to halt said second application when it is determined that said second application is not operating in accordance with said at least one rule Preferably said at least one rule is at least one of: defined by a developer of said first application; defined by a user of said apparatus; automatically created by said apparatus.

Preferably said at least one rule is enforced by at least one of: said first application; an operating system of said apparatus.

Preferably said at least one processor and said at least one memory are configured to cause said apparatus to protect said information by a custom permission of said first application.

Preferably said custom permission is created by a developer of said first application.

Preferably said at least one rule is integrated with said first application.

Preferably said at least one processor and said at least one memory are configured to cause said apparatus to monitor behaviour of said second application for a period of time.

Preferably said monitoring comprises monitoring a manner in which the second application uses the information.

Preferably said monitoring is triggered by said request.

Preferably said at least one processor and said at least one memory are configured to cause said apparatus to deny said information to said second application when a defined threshold number of contraventions of said at least one rule has been reached.

In a fourth aspect there is provided an apparatus comprising means for receiving a request from a second application to access information from a first application, said first and second applications installed on said apparatus, and in response to said request, means for determining whether said second application is operating in accordance with at least one rule.

Preferably said apparatus comprises means for providing said information to said second application when it is determined that said second application is operating in accordance with said at least one rule.

Preferably said apparatus comprises means for denying said information to said second application when it is determined that said second application is not operating in accordance with said at least one rule.

Preferably said apparatus comprises means for halting said second application when it is determined that said second application is not operating in accordance with said at least one rule Preferably said at least one rule is at least one of: defined by a developer of said first application; defined by a user of said apparatus; automatically created by said apparatus.

Preferably said at least one rule is enforced by at least one of: said first application; an operating system of said apparatus.

Preferably said apparatus comprises means for protecting said information by a custom permission of said first application.

Preferably said custom permission is created by a developer of said first application.

Preferably said at least one rule is integrated with said first application.

Preferably said apparatus comprises means for monitoring behaviour of said second application for a period of time.

Preferably said monitoring comprises monitoring a manner in which the second application uses the information.

Preferably said monitoring is triggered by said request.

Preferably said apparatus comprises means for denying said information to said second application when a defined threshold number of contraventions of said at least one rule has been reached.

In a fifth aspect there is provided a method comprising defining at least one rule for operation of an application on a user equipment, said at least one rule related to one or more permissions granted to said application; and detecting when said application attempts to access said one or more permissions; and in response to said detecting, initiating a monitoring period of said operation of said application, and determining whether said application operates in accordance with said at least one rule during said monitoring period.

Preferably when it is detected that said application contravenes said at least one rule, said method comprises at least one of: alerting a user; halting said application.

Preferably said method comprises halting said application if the application contravenes said at least one rule a threshold number of times.

Preferably said at least one rule is defined during installation of said application.

Preferably said method comprises ranking said permissions according to a perceived risk.

According to a sixth aspect there is provided a computer program comprising computer executable instructions which when run on one or more processors performs the method of the fifth aspect.

According to a seventh aspect there is provided an apparatus comprising at least one processor; and at least one memory including computer program code; the at least one memory and the computer program code configured to, with the at least one processor, cause the apparatus at least to: define at least one rule for operation of an application on said apparatus, said at least one rule related to one or more permissions granted to said application; and detect when said application attempts to access said one or more permissions; and in response to said detecting, initiate a monitoring period of said operation of said application, and determine whether said application operates in accordance with said at least one rule during said monitoring period.

Preferably when it is detected that said application contravenes said at least one rule, said at least one processor and said at least one memory are configured to cause the apparatus to at least one of: alert a user; halt said application.

Preferably said at least one processor and said at least one memory are configured to cause the apparatus to halt said application if the application contravenes said at least one rule a threshold number of times.

Preferably said at least one rule is defined during installation of said application.

Preferably said at least one processor and said at least one memory are configured to cause the apparatus to rank said permissions according to a perceived risk.

According to an eighth aspect there is provided an apparatus comprising means for defining at least one rule for operation of an application on said apparatus, said at least one rule related to one or more permissions granted to said application; and means for detecting when said application attempts to access said one or more permissions; and in response to said detecting, means for initiating a monitoring period of said operation of said application, and means for determining whether said application operates in accordance with said at least one rule during said monitoring period.

Preferably when it is detected that said application contravenes said at least one rule, said apparatus comprises means for at least one of: alerting a user; halting said application.

Preferably said apparatus comprises means for halting said application if the application contravenes said at least one rule a threshold number of times.

Preferably said at least one rule is defined during installation of said application.

Preferably said apparatus comprises means for ranking said permissions according to a perceived risk.

Embodiments of the invention will now be described in more detail with respect to the following drawings in which.

In the following certain exemplifying embodiments are explained with reference to a wireless or mobile communication system serving mobile communication devices.

Before explaining in detail the exemplifying embodiments, certain general principles of a wireless communication system and mobile communication devices are briefly explained with reference to FIGS. 1 and 2 to assist in understanding the technology underlying the described examples.

In a wireless communication system mobile communication devices or user equipment (UE) 102, 103, 105 are provided wireless access via at least one base station or similar wireless transmitting and/or receiving node or point. In the FIG. 1 example two overlapping access systems or radio service areas of a cellular system 100 and 110 and three smaller radio service areas 115, 117 and 119 provided by base stations 106, 107, 116, 118 and 120 are shown. Each mobile communication device and station may have one or more radio channels open at the same time and may send signals to and/or receive signals from more than one source. It is noted that the radio service area borders or edges are schematically shown for illustration purposes only in FIG. 1. It shall also be understood that the sizes and shapes of radio service areas may vary considerably from the shapes of FIG. 1. A base station site can provide one or more cells. A base station can also provide a plurality of sectors, for example three radio sectors, each sector providing a cell or a subarea of a cell. All sectors within a cell can be served by the same base station.

Base stations are typically controlled by at least one appropriate controller apparatus so as to enable operation thereof and management of mobile communication devices in communication with the base stations. In FIG. 1 control apparatus 108 and 109 is shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller.

Figure 1:
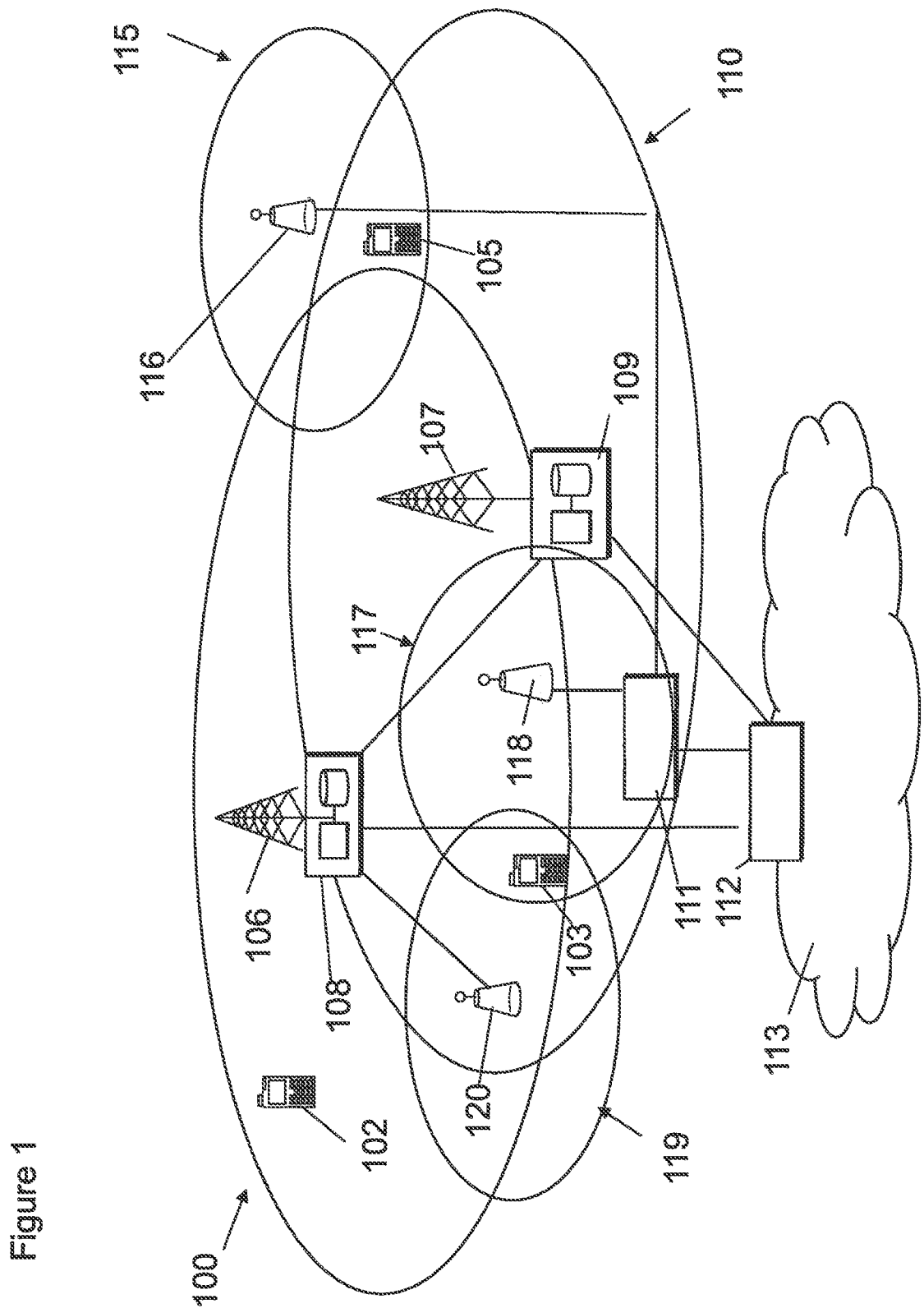
FIG. 1 shows a schematic diagram of a network according to some embodiments.

In FIG. 1 stations 106 and 107 are shown as connected to a wider communications network 113 via gateway 112. A further gateway function may be provided to connect to another network.

The smaller stations 116, 118 and 120 can also be connected to the network 113, for example by a separate gateway function and/or via the controllers of the macro level stations. In this example, stations 116 and 118 are connected via a gateway 111 whilst station 120 connects via the controller apparatus 108. In some embodiments, the smaller stations may not be provided.

An appropriate mobile communication device may be provided by any device capable of sending and receiving radio signals. Non-limiting examples include a mobile station (MS) such as a mobile phone or what is known as a 'smart phone', a computer provided with a wireless interface card or other wireless interface facility, personal data assistant (PDA) provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. Users may also be provided broadcast or multicast data. Non-limiting examples of the content include downloads, television and radio programs, videos, advertisements, various alerts and other information.

The communication devices 102, 103, 105 can access the communication system based on various access techniques, such as code division multiple access (CDMA), or wideband CDMA (CDMA). Other examples include time division multiple access (TDMA), frequency division multiple access (FDMA) and various schemes thereof such as the interleaved frequency division multiple access (IFDMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). A latest 3GPP based development is often referred to as the long-term evolution (LTE) of the Universal Mobile Telecommunications System (UMTS) radio-access technology. The various development stages of the 3GPP LTE specifications are referred to as releases. More recent developments of the LTE are often referred to as LTE Advanced (LTE-A). The LTE employs a mobile architecture known as the Evolved Universal Terrestrial Radio Access Network (E-UTRAN). Base stations of such systems are known as evolved or enhanced Node Bs (eNBs) and may provide E-UTRAN features such as user plane Radio Link Control/Medium Access Control/Physical layer protocol (RLC/MAC/PHY) and control plane Radio Resource Control (RRC) protocol terminations towards the communication devices. Other examples of radio access system include those provided by base stations of systems that are based on technologies such as wireless local area network (WLAN) and/or WiMax (Worldwide Interoperability for Microwave Access).

Figure 2:
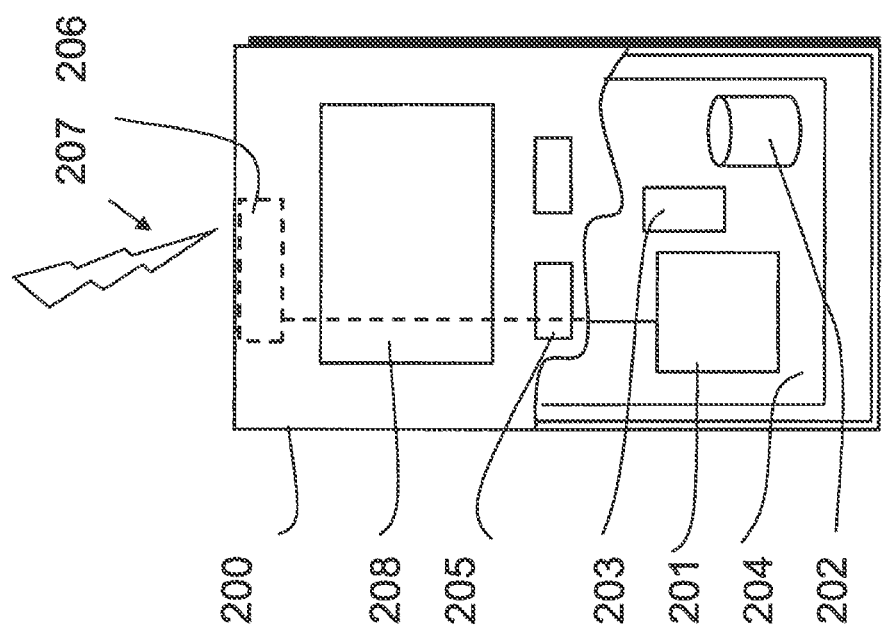
FIG. 2 shows a schematic diagram of a control apparatus according to some embodiments.

A possible mobile communication device for transmitting and retransmitting information blocks towards the stations of the system will now be described in more detail in reference to FIG. 2 showing a schematic, partially sectioned view of a communication device 200. The mobile device 200 may receive signals over an air interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A mobile device is also typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can also be provided. Furthermore, a mobile communication device may comprise appropriate connectors (either wired or wireless) to other devices and/or for connecting external accessories, for example hands-free equipment, thereto.

As discussed briefly above, a user can download an application or app to their user equipment, such as a smart phone. Once downloaded the application can provide an extra functionality to the user equipment, or act as a gateway or shortcut to certain information for a user. Examples of applications include (but are not limited to) news; weather; games; entertainment (such as music and/or videos); communication (such as email and/or SMS); online banking etc.

Apps can be pre-installed on the user equipment, such that they are present the first time a user switches the user equipment on. A user can also download applications to the user equipment. To do this a user typically navigates to an application "market-place" from where a user can search from a number of available applications, select one or more desired applications, and install the one or more applications.

In some current smartphone operating systems the security of the system is partly based upon what are called "permissions". Permissions are requested by an application at install time and if granted the application can use the resources protected by those particular permissions during runtime.

Typically an application developer decides what kind of resources the application has to gain access to in order to work properly. For example the application may need access to calendar data, location data, internet connection etc. The developer then adds a list of corresponding permissions that are needed to access those resources to the application package. When a user has selected an application to be downloaded and starts to install it, a list of permissions (or at least a part of the list) will be presented to the user for approval.

Figure 3:
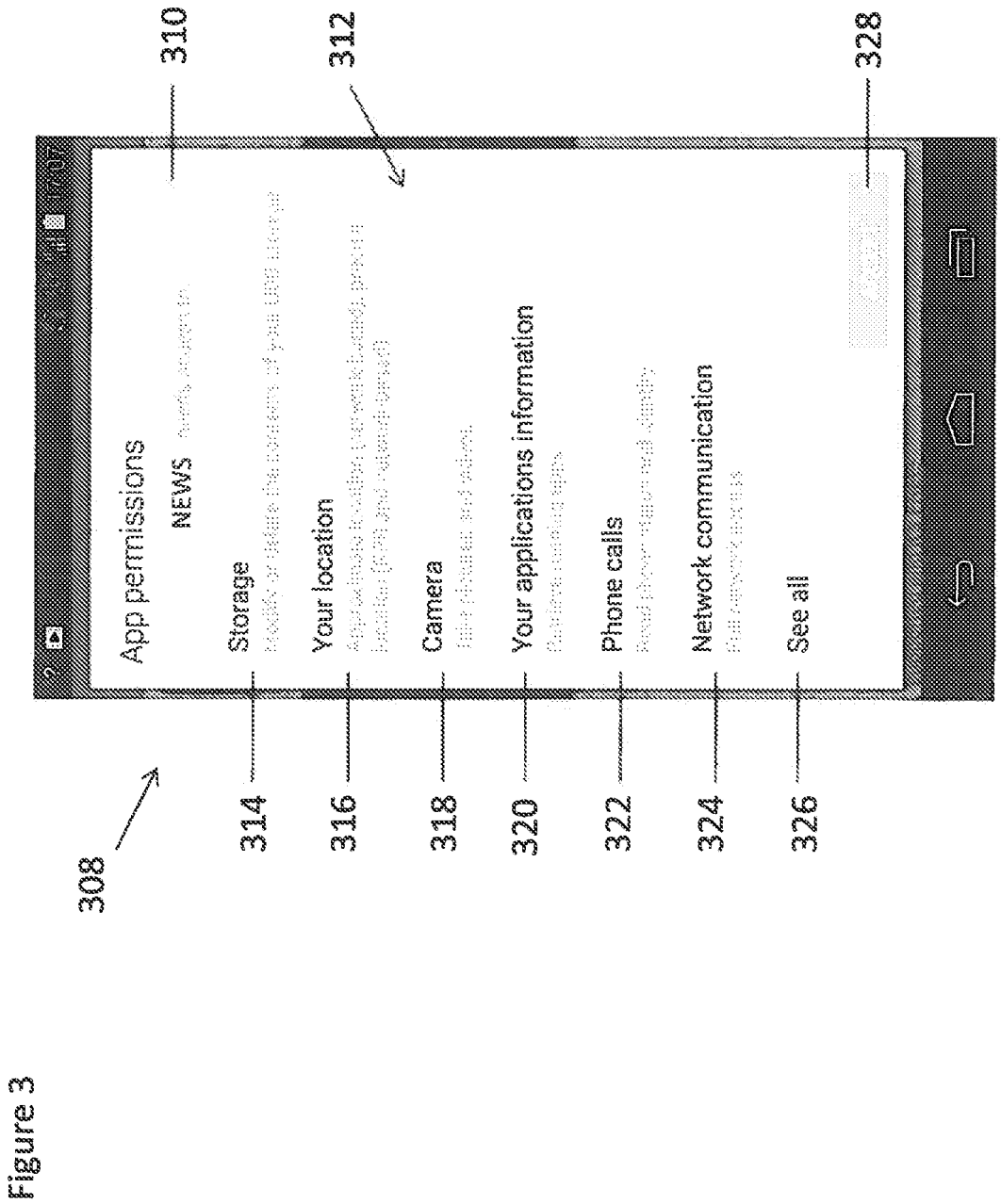
FIG. 3 shows a user interface according to an embodiment.

An example of this is shown in FIG. 3 in which a user has selected a "News" application to be installed. On a user interface 310 of a display 308 of the user equipment, the user is provided with a list 312 of permissions that the news application requests access to. These include "storage" 314, "location" 316, "camera" 318, "your applications information" 320, "phone calls" 322, and "network communication" 324. In this example this is only a portion of the permissions that the news application requests access to and the user can see the full list by selecting the "See all" icon 326. In order to complete installation of the application the user must select the "Accept" icon 328, which means that the user grants the application access to the listed permissions. Typically if the user doesn't agree to all of the permissions the application will not install at all, or at least won't work properly.

For an average user the implication of granting a particular permission might not be clear. Further, combining different permissions can have surprising effects even for permissions that on their own don't necessarily sound risky. The current model assumes that the user is well informed to make sound decisions on what to install. That assumption might not hold true for a large share of users.

The current model for accepting permissions is quite coarse and a fine grained control of application behaviour is difficult to achieve. This is at least partly due to the fact that permissions tend to be very general. By way of example an application having a "network communication" permission can freely set up new network sockets for any reason it chooses to.

Therefore current systems rely on the user checking and granting permissions during installation of the application. During runtime of the application it is only checked whether the application has the required permission to access the resource, and not necessarily anything else.

As will be discussed in more detail below, embodiments may provide a user (such as an end user of the user equipment or an app developer themselves) a flexible framework for specifying which permissions the user allows the app to access, and/or the way in which the app can behave during runtime. Embodiments may use information or combine information from various sources and compare that information against predefined rules in order to detect a possibly misbehaving application. The information that is used could be for example time, network usage, location, other running applications etc. It should be appreciated that this list is not exhaustive and that of course other information sources may be used.

By way of example only, an application that can be used to edit images taken with a smart phone can be considered. Such an application will need access to memory storage for retrieving the original image and for storing the edited image. Therefore a user may be happy to provide permission for the application to access memory storage. It might also be possible with such an application to download new special effects or the like that the user can use to edit the images. Therefore a user may also be happy to provide the corresponding permission to allow the application to access the Internet. However, the granularity of such permissions is typically very coarse. For example the user may be happy for the application to download the aforementioned "special effects", however the general internet access permission may allow the application to perform much broader activities than this. For example the application could in theory, with the generalised internet access, upload a user's personal data from memory storage to a server in the Internet without the user's consent.

Embodiments may provide a user with the option to specify or limit actions that an application may take with respect to a particular permission. By way of example only a user may be able to specify that an application has permission to download information from the internet, but not to upload information, and vice versa. A user may also be able to specify a limit or threshold for the amount of data that an application can download and/or upload. In further embodiments a user can specify times at which the application can access the authorised permission. The user may also specify where (e.g. particular website) the application is permitted to download and/or upload information from and to.

It will of course be appreciated that the above examples of parameters that the user can specify are not exhaustive. In general terms a user can adjust the granularity of permissions that are granted to an application.

It will also be appreciated that embodiments still enable coarse permission and/or denials of permissions. For example using the example of the image editing application discussed above, a user may wish to deny permission in a coarse manner, so as to completely deny the image editing application access to text messages.

To provide a user with finer granularity regarding the permissions granted to applications, in embodiments a user can define "rules" that an application should (or must) adhere to. Such rules can be defined at any time. In some embodiments a user can define the rules at the time of installing the application.

Figure 4:
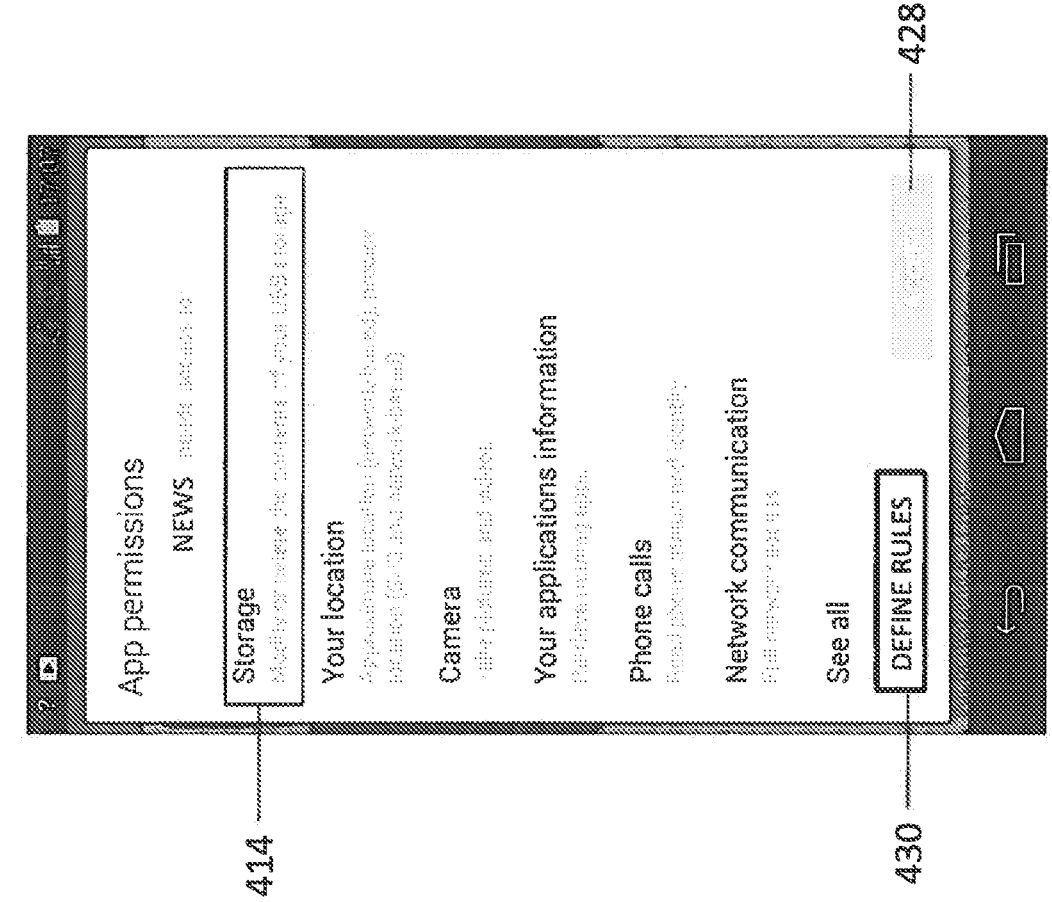
FIG. 4 shows a user interface according to an embodiment.

Such an embodiment is shown in FIG. 4. This is similar to the example of FIG. 3, except in addition to the "Accept" button 428, there is also provided a "Define Rules" icon 430.

By selecting this icon the user can define rules for particular permissions. In this embodiment the user can "Accept" or "Define rules" for each permission in turn. In this example the user has selected the "Storage" parameter 414 in the list, as shown by the box surrounding that parameter. The user can either fully accept this permission by selecting icon 428, or can choose to define rules for this permission by selecting "Define Rules" icon 430. The user can do this for each parameter in the list.

If the user selects the "Define Rules" icon for any of the parameters, then the user is taken to a further screen in which those rules can be specified. For example a user can specify which parts of the memory storage the particular application is permitted access to. Using the example of an image editing application, a user may for example wish to specify that the application is permitted access to stored images and nothing else. For a weather application a user may wish to specify that an application is permitted access to location data, and nothing else etc.

In another embodiment a user can set rules before installing an application. For example a user can set generic rules through a "Settings" menu on the user equipment using which the user can set generic rules by which any downloaded applications must comply. These generic rules can be set or updated at any time.

In embodiments a user can also define rules after an application has been installed. For example the user can bring up the "app permissions" list (as shown for example in FIG. 4) to accept permissions or define rules for permissions at any time.

The rules, once they have been defined, may be configured to cause the user equipment to monitor the behaviour of the application during runtime. That is in addition to providing initial permissions the rules may define the behaviour that the application should follow, and the behaviour of the app is monitored to ensure that the rules are adhered to.

In some embodiments, as described above, the rules can be defined by the user. In another embodiment the rules could be defined by the developer of the application.

In such an embodiment a user may be provided with an option such as "Accept developer defined rules and permissions?". The application developer may be incentivised to define rules in a manner that makes the app secure for the user, so that the developer can become a "trusted" vendor of applications.

In another embodiment the rules may be automatically created based on the requested permissions and the description of the application. Previous user behaviour, for example taking into consideration the type of permissions that the user typically allows, may be considered when automatically creating the rules. This embodiment is convenient for the user since it minimises user intervention.

Some embodiments may use a trusted third party (such as or similar to a certification authority). The third party could either validate the app developer generated rules or create new rules altogether.

Alternatively, or in combination, "overprivilege" (e.g. excessive or non-permitted use of permissions) by applications can be detected. For example the number of API (Application Programming Interface) calls that an application uses can be determined, and those API calls can then be mapped to permissions. Over time a permissions map can be automatically built, which can subsequently be used to detect overprivilege.

In some embodiments the application behaviour can be first analysed in a "sandbox" environment (e.g. isolated from other software on the user equipment) and then the requested permissions can be mapped to the function calls that the program has made during "normal" operation. If there are permissions that the app requests but doesn't appear to need (for example a "weather" app requesting access to an email account of a user), then rules can be defined that will block the use of those permissions. In some embodiments the user might have to approve the permissions during installation in order to get the app working.

Additionally, rules can be defined for how to limit the use of the permissions, once it has been determined how an app should behave. This can enable detection of when a possibly malicious app tries to "piggy-back" its way into some data it should not have access to by using a possible security vulnerability of an otherwise legitimate app (privilege escalation).

Each of the above described embodiments can be used independently or in combination. That is, for example, a user can alter rules that have been set by the developer or which have been automatically created.

In some embodiments a user may be presented with the option of creating rules for only the most "dangerous" or "risky" permissions. What is considered a "dangerous" or "risky" permission can be itself user defined at any point, or may be automatically determined by the user equipment, or may be determined by the application developer. This may speed up the rule defining process since the user may be presented with fewer options. In another embodiment the permission requests may be ranked according to their perceived "danger" or "risk", and presented to the user in a ranked fashion i.e, with the most dangerous permissions at the top of the list. "Dangerous" permissions could be for example location data, access to an email account, access to text messages or any permission that might affect the user's privacy. Also permissions that might cost the user money (e.g. Internet access, calling, sending text messages etc.) could be ranked as "Dangerous".

Once the app is running the behaviour of the app may then be monitored for a period of time. This period may be the entire period in which the app is running. Alternatively it may be a shorter period. In some embodiments the behaviour is monitored periodically.

Therefore according to some embodiments the behaviour of the app or a check as to whether the app is only using permissions it has been granted is not only checked at the point of opening the app, but the behaviour is monitored for a period of time during run-time to check that the app is operating according to the defined rules. This may prevent an app from initially running according to defined rules, and then subsequently contravening those rules a period of time after the app has been opened.

The "rule enforcement system" could be notified when an app is started. At this point a check may be made in a "rules database" to see the rules that are defined for that app. If there are no rules defined for that app in the rules database, then nothing needs to be done when that application makes a function call that requires the use of a particular permission later on. However, if there are rules defined for the app, then the enforcement system would start to monitor the application behaviour. When the app makes a call that requires the use of a certain permission, it is checked if that particular permission is accompanied by a rule (or rules). If it is, then the monitoring phase for that app is triggered. In some cases the determination can be made instantaneously (that is the "monitoring" covers only the point in time that the permission is requested). However in many cases the actions carried out by an application following grant of a permission to that application are of interest, so in some embodiments the monitoring continues for a period following grant of the permission. This period could be user defined, automatically defined, or defined by the app developer. In some embodiments the monitoring period is the entire active period of the application. By way of example, if there is a quota for uplink traffic, then when the "Internet" permission is requested monitoring of the amount of data sent on the uplink can be commenced and monitored for the defined period.

If a violation of a rule is noticed the user could be alerted. For example a message could appear on the display of the user equipment to warn the user that the app may be operating in a suspicious manner. Alternatively or in addition a different alert such as a vibration or a sound may be used to alert the user. In some embodiments the application is automatically halted if it contravenes one or more rules. In another embodiment an alert is only created after a predefined number of contraventions of the rules.

In embodiments where the "permissions" are ranked according to their "danger", whether an alert is created or the application is halted may depend upon the ranking of the permission in question that has been violated and its associated rule. For example an application may be immediately halted if a rule associated with a high ranking permission is contravened. If a middle or low ranking permission and its associated rule is contravened then the user may only be alerted or the application halted after a number of violations.

In some embodiments an alert or halting of the application may occur when certain combination of permissions are requested by an application. For example a rule could be set such that an alert is created or the application is halted if the application requests location information and attempts to access the user equipment memory, either simultaneously or within a predetermined time period.

The enforcement of the rules may be carried out in real time. For example when the application issues a call that would break a rule, a user would need to approve the action before the application proceeds. Alternatively the information can be simply provided to the user (for example "app X has breached the rule Y"), and using that information the user can decide whether to allow the app to continue or to stop the app. In this way the simplicity of the existing permissions based system can be maintained, with the rules providing an additional level of security separate from the actual permission enforcement.

Typically on an app purchasing platform there is provided some kind of description of the application. In some embodiments keywords can be extracted from that description relating to features of the application. The description can then be analysed against the requested permissions to generate possible rules. For example if an application is advertised for the purposes of downloading music, then the "Internet" permission could have a rule that would monitor possible uplink traffic, and notify the user of such. For example a notification may be provided if excessive data is being provided on the uplink to the application.

Figure 5:
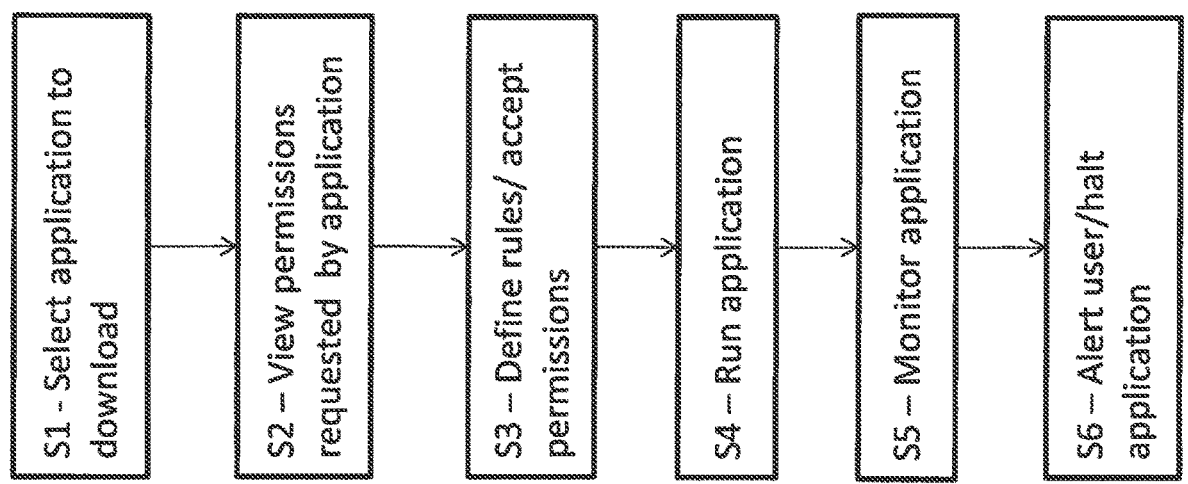
FIG. 5 is a flow chart showing steps according to an embodiment.

FIG. 5 is a flow chart showing the steps according to an embodiment. In this embodiment the user has entered an applications market place or vendor.

At step S1 the user selects an application to download.

At step S2 the user can view the permissions requested by the application. For example a list of permissions as shown in FIG. 4 is displayed to the user.

At step S3 the user can define rules associated with a particular permission, or can accept each permission. This can be done on a permission by permission basis, or the user can choose to accept all permissions in one go. The rules may be defined in the manner described above.

At step S4 the user runs the application.

This initiates, at step S5, monitoring of the application. During this period it is monitored whether the application contravenes any of the defined rules.

At step S6 the user is alerted, and/or the application is halted if it is determined that the application has contravened one or more of the rules.

It will be appreciated that the flowchart of FIG. 5 is by way of example only. It will be appreciated that step S3 may be carried out by the user, or automatically by the user equipment, as discussed above. In embodiments where the rules are defined by the application developer then steps S2 and S3 may be optional. As discussed above step S3 of defining the rules/accepting permissions may be carried out separately from the downloading of the application i.e. the user may set generic rules/permissions to be applied to any app that is downloaded.

Where the rules are defined by the application developer, then in some embodiments the developer can define rules regarding how that application interacts with other applications. By way of example, it is possible for an application (app A) to make some service or functionality available to other applications (app B). The functionality can be protected by a custom permission generated by the developer of app A. This custom permission can be enforced either in the operating system (OS) like any other permission, or alternatively it can be enforced by app A itself.

In some cases, the developer of app A might not have total (or any) control of which apps are permitted to use the functionality of app A, particularly if the developer of app A is not in control of granting permissions (the end user may have control over the permissions). Hence any app that has knowledge of a service that app A provides may be able to add that permission to its list of requested permissions, and the developer of app A may have little or no control over whether that particular app (app B) will be granted that permission. Accordingly, in an embodiment the developer of application A can define rules that will need to be followed by application B (or any number of other applications) in accessing the protected functionality/resource from application A. That is in such an embodiment simply having the correct permission may not be enough, if the permission is not used in the correct way. As with the embodiments described above, the application developer can define what happens if a rule is broken. For example the action to be taken does not have to always be the same. For example a simple breaking of a rule might be deemed acceptable, but multiple violations within a certain time period might "blacklist" that application (application B) from accessing the resource.

Figure 6:
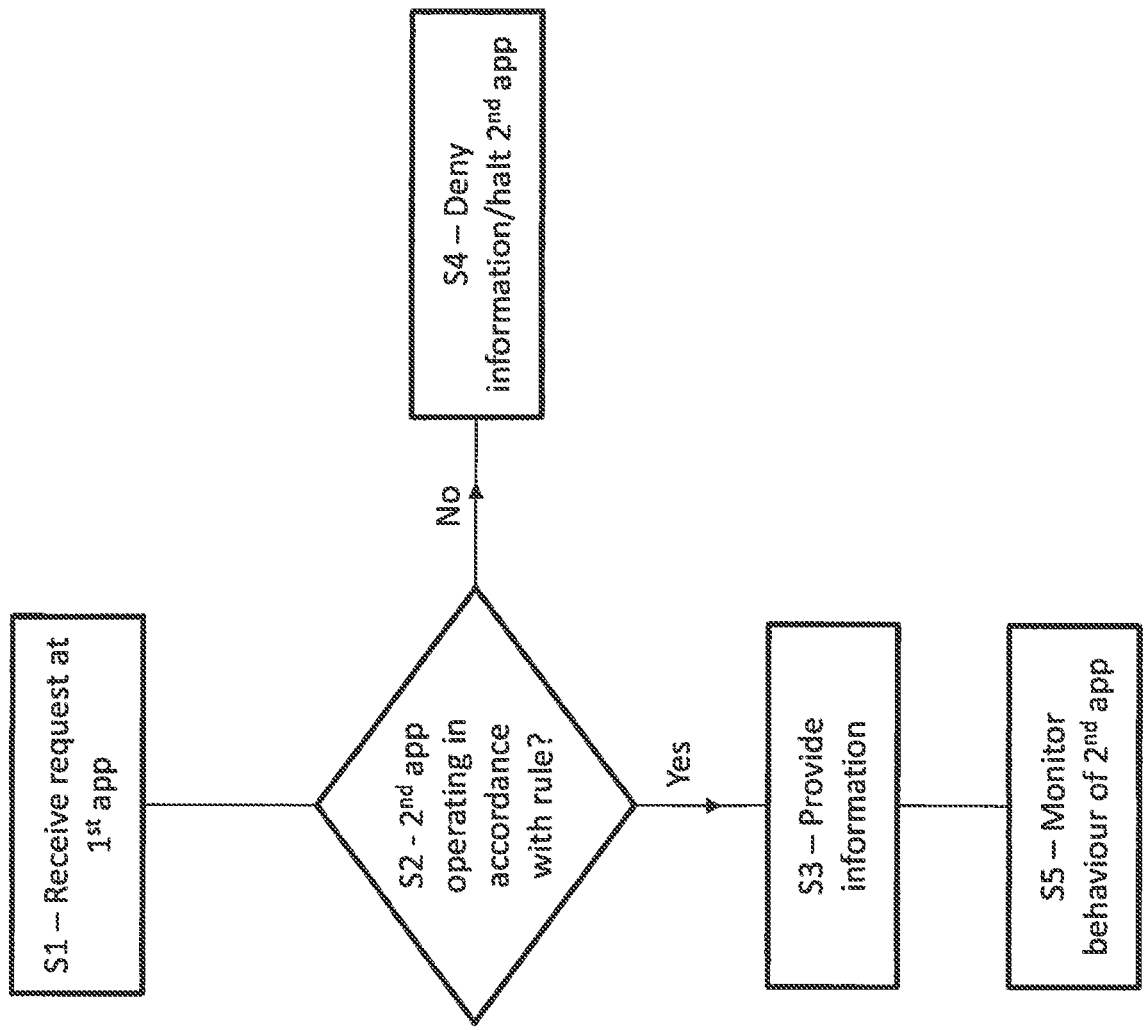
FIG. 6 is a flow chart showing steps according to another embodiment.

An example is shown in the flow chart of FIG. 6. It is assumed that a user equipment has first and second applications installed thereon.

At step S1 the first application receives a request from a second application to access information from the first application.

At step S2 a determination is made as to whether the second application is operating in accordance with a rule. This may be a predefined rule. This rule may be defined as discussed above. In one embodiment the rule is defined by a developer of the first application. However the rule could be defined by an end user or automatically created by the user equipment. The rule can be integrated with the first application or "bundled" therewith. In such an embodiment the rule may be automatically installed along with the first application.

If the second application is operating in accordance with the rule, then at step S3 the requested information is provided to the second application.

However, if the second application is not operating in accordance with the at least one rule, then at step S4 the information is denied to the second application, or the second application may be halted.

Step S5 shows an additional step of monitoring the behaviour of the second application. In FIG. 6 this is shown as following on directly from step S3, but in other embodiments this monitoring may follow or precede any of the other steps shown in FIG. 6. In one embodiment the monitoring is triggered by the request received at the first application. In another embodiment the behaviour of the second application is already being monitored before the request is received at the first application.

It will of course be understood that the embodiment of FIG. 6 is by way of example only and that other embodiments may include more/fewer steps.

It will be appreciated that there are various ways in which the embodiments can be implemented. For example it could be an integrated part of the user equipment operating system. That is the user may be able to control the permissions and associated rules via a settings menu on the user equipment. Alternatively the functionality may itself be provided in an app that is downloadable to the user equipment. In this case the app developer may be the manufacturer of the user equipment in question.

Once the application is downloaded the permissions and/or associated rules can then be defined by entering the application.

It will be appreciated that some embodiments may provide an additional level of security that can help a user to make educated decisions regarding how to control the information provided to applications, or even block some potentially harmful function calls independently.

An appropriately adapted computer program code product or products may be used for implementing the embodiments, when loaded on an appropriate data processing apparatus, for example for determining geographical boundary based operations and/or other control operations. The program code product for providing the operation may be stored on, provided and embodied by means of an appropriate carrier medium. An appropriate computer program can be embodied on a computer readable record medium. A possibility is to download the program code product via a data network. In general, the various embodiments may be implemented in hardware or special purpose circuits, software, logic or any combination thereof. Embodiments of the inventions may thus be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

It is also noted herein that while the above describes exemplifying embodiments of the invention, there are several variations and modifications which may be made to the disclosed solution without departing from the scope of the present invention.

The invention claimed is:

1. A method comprising:
analyzing operation of a second application to identify function calls made by the second application during operation, said second application installed on a user equipment;
generating, based on the function calls, a permissions map, the permissions map indicating resources the second application is allowed to access;
defining at least one rule associated with a first permission defined by said permissions map, said at least one rule automatically created by said user equipment, said at least one rule specifying at least one action, with respect to said first permission, that said second application may take;
receiving a request from said second application to access information requiring use of said first permission from a first application, said first application installed on said user equipment;
in response to said request, determining whether said second application is operating in accordance with said at least one rule associated with said first permission;
monitoring, based on said at least one rule associated with said first permission, behavior of the second application, said monitoring including a period of time during run-time of said second application; and
causing said second application to operate consistent with said at least one rule associated with said first permission, such that an alert is generated or said second application is halted based on said at least one rule, associated with said first permission, being contravened.

2. The method of claim 1, further comprising providing said information to said second application when it is determined that said second application is operating in accordance with said at least one rule.

3. The method of claim 1, further comprising denying said information to said second application when it is determined that said second application is not operating in accordance with said at least one rule.

4. The method of claim 1, wherein said at least one rule is at least one of: defined by a developer of said first application or defined by a user of said user equipment.

5. The method of claim 1, wherein said information is protected by a custom permission of said first application.

6. The method of claim 5, wherein said custom permission is created by a developer of said first application.

7. The method of claim 1, wherein said at least one rule is integrated with said first application, and wherein the at least one rule is automatically created by said user equipment, rather than by a user of the user equipment.

8. The method of claim 7, further comprising monitoring behavior of said second application for a period of time, wherein the at least one rule is automatically created by said user equipment based on permissions the user has previously allowed, and wherein at least one of the first application and the second application is an application downloaded wirelessly to the user equipment.

9. An apparatus comprising
at least one processor;
and at least one memory including computer program code;
the at least one memory and the computer program code configured to, with the at least one processor, cause the apparatus at least to:
analyze operation of a second application to identify function calls made by the second application during operation, said second application installed on said apparatus;
generate, based on the function calls, a permissions map, the permissions map indicating resources the second application is allowed to access;

define at least one rule associated with a first permission defined by said permissions map, said at least one rule automatically created by said apparatus, said at least one rule specifying at least one action, with respect to said first permission, that said second application may take;

receive a request from said second application to access information requiring use of said first permission from a first application, said first application installed on said apparatus;

in response to said request, determine whether said second application is operating in accordance with said at least one rule associated with said first permission;

monitor, based on said at least one rule associated with said first permission, behavior of the second application, said monitoring including a period of time during run-time of said second application; and cause said second application to operate consistent with said at least one rule associated with said first permission and in accordance with the mapping of said permission such that the mapping indicates said permission complies with the function calls made by the second application, such that an alert is generated or said second application is halted based on said at least one rule, associated with said first permission being contravened.

10. The apparatus of claim 9, wherein said apparatus is further configured to at least provide said information to said second application when it is determined that said second application is operating in accordance with said at least one rule.

11. The apparatus of claim 9, wherein said apparatus is further configured to at least deny said information to said second application when it is determined that said second application is not operating in accordance with said at least one rule.

12. The apparatus of claim 9, wherein said at least one rule is at least one of: defined by a developer of said first application or defined by a user of said apparatus.

13. The apparatus of claim 9, wherein said apparatus is further configured to at least protect said information by a custom permission of said first application.

14. The apparatus of claim 13, wherein said custom permission is created by a developer of said first application.

15. The apparatus of claim 9, wherein said at least one rule is integrated with said first application, and wherein the at least one rule is automatically created by said user equipment, rather than by a user of the apparatus.

16. The apparatus of claim 15, wherein said apparatus is further configured to at least monitor behavior of said second application for a period of time, wherein the at least one rule is automatically created by said apparatus based on permissions the user has previously allowed, and wherein at least one of the first application and the second application is an application downloaded wirelessly to the apparatus.

* * * * *